United States Patent [19]

Ogyu

[11] 4,406,274
[45] Sep. 27, 1983

[54] SOUND ARRESTER OF CIRCULAR BLADE

[76] Inventor: Shingo Ogyu, 2-6-13 Yahei, Kawaguchi, Saitama, Japan

[21] Appl. No.: 268,146

[22] Filed: May 28, 1981

[30] Foreign Application Priority Data

Jun. 3, 1980 [JP] Japan .................................. 55-73691

[51] Int. Cl.³ .............................................. B28D 1/04
[52] U.S. Cl. .................................... 125/13 R; 51/267
[58] Field of Search ....................... 125/13, 15; 51/267

[56] References Cited

U.S. PATENT DOCUMENTS 2,990,828  7/1961  Hoerer .................................. 125/15
2,991,599  7/1961  Else ..................................... 51/267

Primary Examiner—Harold D. Whitehead
Attorney, Agent, or Firm—Schwartz & Weinrieb

[57] ABSTRACT

A sound arrester of a circular blade which is able to be rotated around an axis substantially disposed horizontally for cutting stone or the like is provided. The sound arrester includes a cover portion for covering approximately the upper half portion of the blade, a tank portion which is disposed under the cover portion and has a long elongated hole at the bottom thereof so as to pass the lower portion of the blade therethrough, and liquid supplying means for supplying liquid into the tank portion whereby a space surrounded by the cover portion is able to be cut off from outer atmosphere.

3 Claims, 4 Drawing Figures

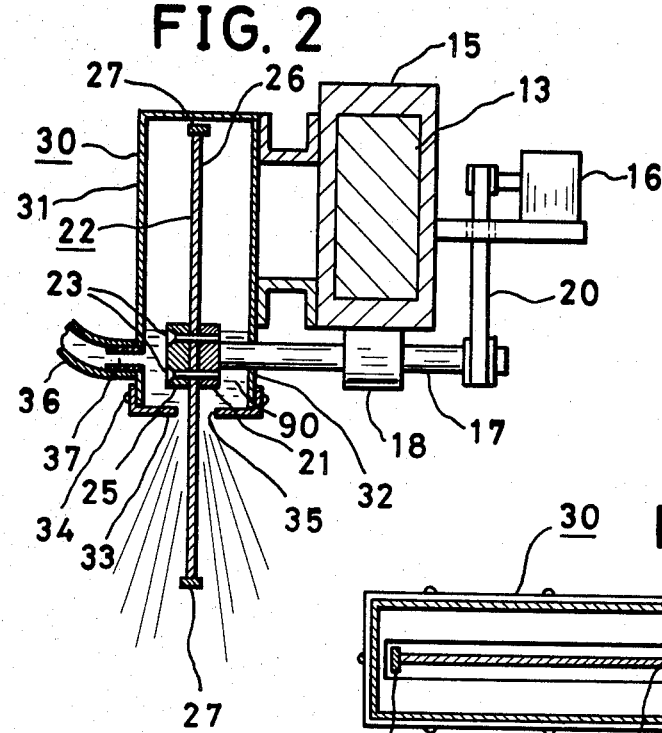
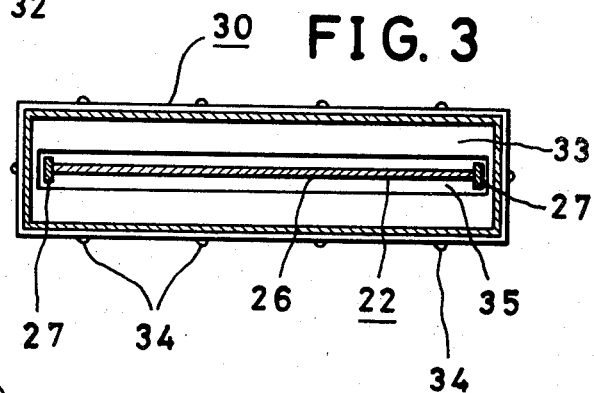
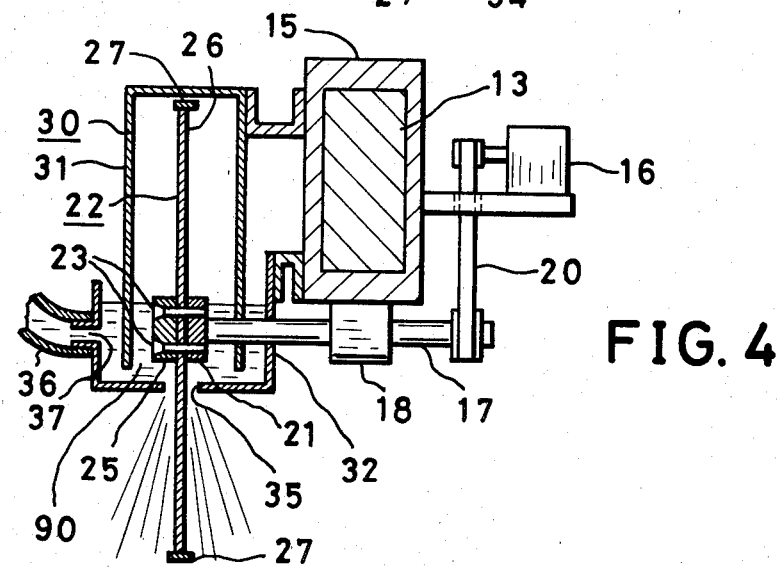

SOUND ARRESTER OF CIRCULAR BLADE

FIELD OF THE INVENTION

This invention relates to a sound arrester of a circular blade which is able to be rotated around an axis substantially disposed horizontally for cutting stone or the like.

BACKGROUND OF THE INVENTION

In the case of using a circular blade for cutting stone, fire brick or the like, a great noise is created. The noise causes an environmental problem and increases the fatique of workers. Ogyu Japanese non-examined Utility Model Publication No. 54-94989 discloses a device which has plural pairs of pressing members, each pair of the pressing members are oppositely positioned at both sides of the blade so as to press the blade by equal forces from both surfaces thereof. Therefore, the noise is largely reduced. But, large frictional forces are created between the blade and the pressing members, thus the pressing members are rapidly consumed and a large loss of power is obtained.

OBJECTS OF THE INVENTION

Accordingly, it is an object of this invention to provide a sound arrester of a circular blade for cutting stone or the like which is able to reduce the sound created by the blade without large frictional forces, whereby consumable pressing members are not necessary and a large loss of power is avoided.

Another object of this invention is to provide a sound arrester of a circular blade for cutting stone or the like which has a simple structure and a large utility.

SUMMARY OF THE INVENTION

According to the invention, there is provided a sound arrester of a circular blade which is able to be rotated around an axis substantially disposed horizontally for cutting stone or the like. The sound arrester has a cover portion for covering approximately the upper half portion of the blade, a tank portion which is disposed under the cover portion and has a long elongated hole at the bottom thereof so as to pass the lower portion of the blade therethrough, and liquid supplying means for supplying liquid into the tank portion whereby a space surrounded by the cover portion is able to be cut off from the outer atmosphere. The cover portion and the tank portion may be made as the same structure. The cover portion and the tank portion may be made as separate structures, wherein the lower end of the cover portion is inserted into the tank portion.

BRIEF DESCRIPTION OF DRAWINGS

Various other objects, features, and attendant advantages of the present invention will be more fully appreciated as the same becomes better understood from the following detailed description when considered in connection with the accompanying drawings in which like reference characters designate like or corresponding parts throughout the several views and wherein:

FIG. 2 is a sectional view taken along the line 2—2 of FIG. 1;

FIG. 3 is a sectional view taken along the line 3—3 of FIG. 1; and

FIG. 4 is a corresponding sectional view to FIG. 2 in another embodiment of this invention.

DETAILED DESCRIPTION

Figure 1:
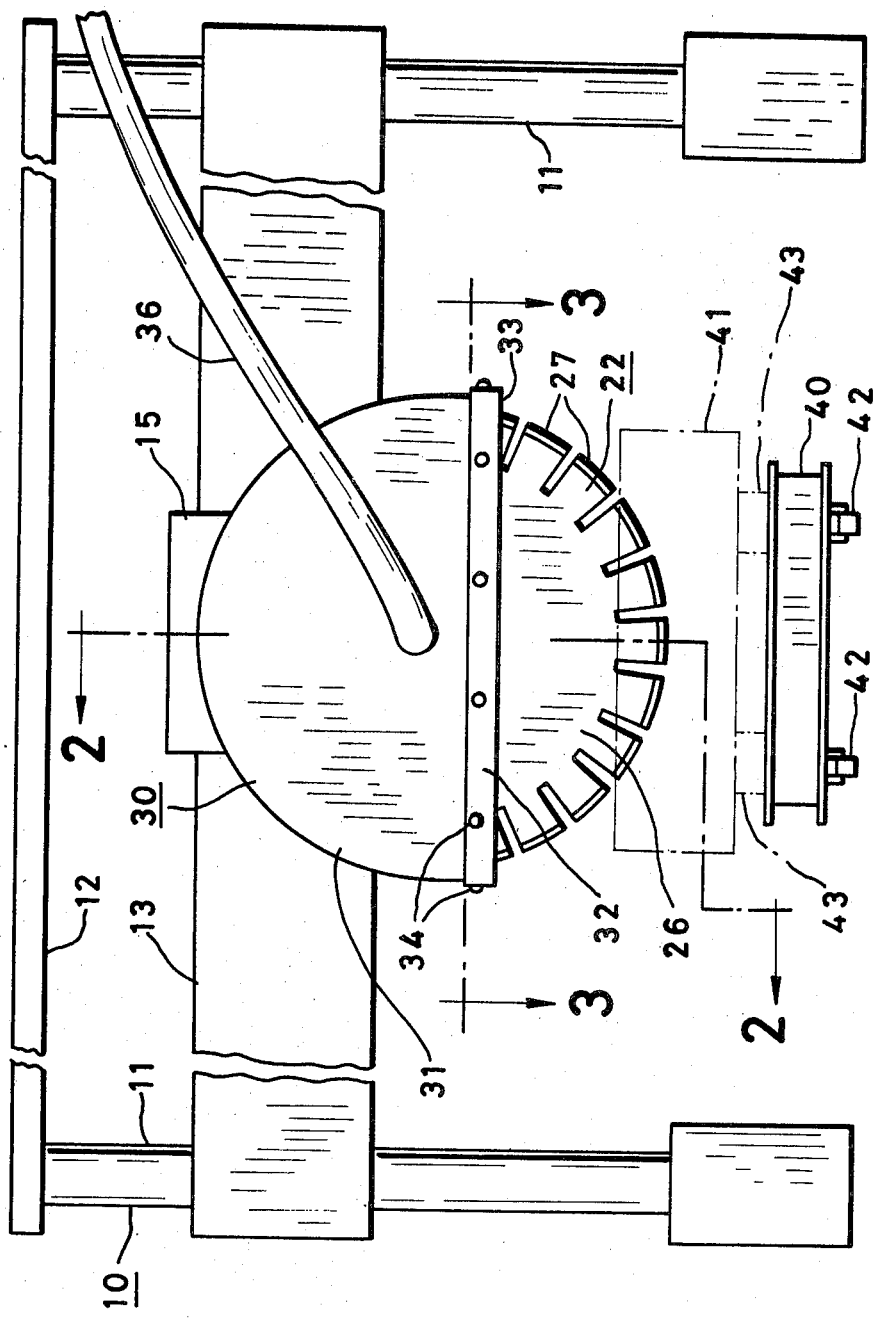
FIG. 1 is a front view of an embodiment of this invention partially cut away.

Referring now to FIGS. 1-3, there is shown an embodiment of this invention. 10 designates a fixed frame which has a pair of poles 11 elongated vertically and a horizontal member 12 which connects the upper ends of the poles. A guide member 13 is disposed horizontally and adapted to be raised and lowered by a motor (not shown), both ends thereof being guided by the poles 11. 15 designates a movable member which is able to be moved along the guide member 13 by a motor (not shown). A motor 16 is connected to the movable member 15 and drives a shaft 17 which is elongated horizontally and supported by a bearing 18 by means of a belt 20. An attaching member 21 is fixed to an end of the shaft 17. A circular blade 22 is fixed to the attaching member 21 by a plurality of bolts 23 and a pressing member 25. The blade 22 is composed of a circular plate 26 made of steel and many cutting portions 27 around the circumference of the plate, each cutting portion being made of material which includes diamond powder.

30 designates a sound arrester which has a cover portion 31 for covering approximately the upper half portion of the blade 22 and a tank portion 32 formed as the same structure with the cover portion by fixing a bottom plate 33 to the lower end of the cover portion by means of bolts 34. The tank portion 32 has a long elongated hole 35 within the bottom plate 33 so as to pass the lower portion of the blade 22. The sound arrester 30 also includes liquid supplying means or a hose 36 for supplying liquid such as water 90 or the like into the tank portion 32. One end of the hose 36 is connected to an inlet port 37 of the tank portion 32, the other end of the hose being connected to a pump, a water pipe (both are not shown) or the like.

A carriage 40 is provided for conveying a block of stone 41 and adapted to move along a pair of rails 42. The block of stone 41 is supported on a pair of wood pieces 43 disposed on the carriage 40. The block of stone 41 is able to be cut by the blade 22 which is driven by the motor 16 and moved together with the movable member 15 along the guide member 13.

During cutting of the block of stone 41 by the blade 22, water 90 is continuously supplied into the tank portion 32 from the hose 36. The water in the tank portion 32 flows downwardly passing through the long elongated hole 35 around the blade 22. The upper surface of the water 90 in the tank portion 32 is able to be maintained to have a necessary height so as to cut off a space in the cover portion 31 from the outer atmosphere. The downwardly flowing water effects on cooling and lubrication of the blade 22.

When the blade 22 has been moved from one end of the block of stone 41 to the other end thereof, the guide member 13 is lowered a suitable small length, then the cutting of the block of stone 41 is to be continued in the opposite direction by the blade 22. By repeating such operations, the block of stone 41 is to be perfectly cut off so as to become two pieces.

In case of cutting the block of stone 41 by rotating the blade 22, the blade is supported by the shaft 17 at the central portion thereof and also supported by the block of stone 41 at lower portion thereof. Therefore, within the lower half portion of the blade 22, the amplitude of vibration and created noise are not large. But, within the upper half portion of the blade 22, the amplitude of vibration and created noise are large. The large noise created in the cover portion 31 is not able to be transmitted to the outer atmosphere, because the sound arrester 30 cuts off the space in the cover portion 31 from the outer atmosphere. The sound arrester 30 also has a high utility, because it has a simple structure and no consumable members.

In FIG. 4, another embodiment of this invention is shown. A cover portion 31 and a tank portion 32 are made as separate structures, the lower end of the cover portion 31 being inserted into the tank portion 32. The embodiment shown in FIG. 4 behaves as the same with the embodiment shown in FIGS. 1-3.

The foregoing is of course considered as illustrative only of the principle of the invention. Obviously, numerous modifications of the present invention are possible in light of the above teachings.

I claim:

1. A sound arrester, for a circular cutting blade which is rotatable about an axis disposed substantially horizontally, comprising:
   a cover for covering approximately the upper half portion of said cutting blade;
   liquid reservoir tank means, operatively disposed in connection with the lower end of said cover, for housing a mass of liquid, said liquid reservoir tank means having laterally spaced, upstanding sidewalls, longitudinally spaced, upstanding end walls connected to said sidewalls along their respective upwardly extending edge portions, and a bottom wall interconnecting the lower ends of said sidewalls and said end walls, an elongated slot being defined within said bottom wall for passage therethrough of the lower portion of said cutting blade, said sidewalls, said end walls, and said slotted bottom wall of said liquid reservoir tank means thereby defining an annular, endless loop flow path for said mass of liquid within said liquid reservoir tank means which peripherally surrounds said cutting blade; and
   means for continuously supplying said liquid into said endless loop flow path of said liquid reservoir tank means from only one side of said liquid reservoir tank means relative to said circular cutting blade,
   said sidewalls of said liquid reservoir tank means each being disposed away from the plane of said circular cutting blade by means of a distance at least equal to a several-fold multiple of the thickness of said circular cutting blade so as to define said liquid reservoir tank means which is elongated in the transverse direction of said cover and therefore elongatedly extending in the direction of said circular cutting blade axis, said liquid reservoir tank means thereby housing a massive body of said liquid of substantial transverse lateral width within said endless loop flow path circuit peripherally surrounding said circular cutting blade which transversely stabilizes said circular cutting blade by dissipating vibrations generated within said lower portion of said cutting blade and thereby preventing the transmission of said vibrations to said upper portion of said cutting blade, and wherein further, said transversely massive body of said liquid within said liquid reservoir tank means endless loop flow path circuit peripherally surrounding said circular cutting blade also reduces the noise normally heard by personnel within the vicinity of said circular cutting blade by dissipating the sound waves generated by means of said upper portion of said circular cutting blade within said cover and thereby preventing the transmission of said sound waves out of said cover and into the ambient atmosphere.

2. A sound arrester as set forth in claim 1, wherein said cover portion and said tank portion are made as the same structure.

3. A sound arrester as set forth in claim 1, wherein said cover portion and said tank portion are made as separate structures, lower end of said cover portion is inserted into said tank portion.

* * * * *